(12) United States Patent
Choi et al.

(10) Patent No.: US 9,338,118 B2
(45) Date of Patent: May 10, 2016

(54) APPARATUS AND METHOD FOR TRANSMITTING PUSH NOTIFICATION MESSAGE

(75) Inventors: Jung-Hwan Choi, Seoul (KR); Hee Seo, Seoul (KR); Ka-Ram Ko, Gyeonggi-do (KR); In-Gyu Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 129 days.

(21) Appl. No.: 13/435,884

(22) Filed: Mar. 30, 2012

(65) Prior Publication Data

US 2012/0254390 A1    Oct. 4, 2012

(30) Foreign Application Priority Data

Mar. 30, 2011    (KR) .................. 10-2011-0029119

(51) Int. Cl.
*G06F 15/173*    (2006.01)
*H04L 12/58*    (2006.01)

(52) U.S. Cl.
CPC ................. *H04L 51/30* (2013.01); *H04L 51/38* (2013.01)

(58) Field of Classification Search
CPC ..................................................... G06F 15/173
USPC ........................................................... 709/223
See application file for complete search history.

(56) References Cited

U.S. PATENT DOCUMENTS

| | | | |
|---|---|---|---|
| 2007/0190978 A1* | 8/2007 | White et al. | 455/412.1 |
| 2010/0217817 A1 | 8/2010 | De Boer et al. | |
| 2010/0217870 A1 | 8/2010 | Zhou et al. | |
| 2012/0173610 A1* | 7/2012 | Bleau et al. | 709/203 |

\* cited by examiner

*Primary Examiner* — Vivek Srivastava
*Assistant Examiner* — Sibte Bukhari
(74) *Attorney, Agent, or Firm* — The Farrell Law Firm, P.C.

(57) ABSTRACT

Provided is an apparatus and method for transmitting a push notification message. To this end, connection is performed with a mobile terminal, and if a push notification message is received from a push notification service providing server, the received push notification message is transmitted to the mobile terminal, and when disconnected from the mobile terminal, a push notification message received after the disconnection is stored, such that transmission of the push notification message can be guaranteed.

16 Claims, 4 Drawing Sheets

APPARATUS AND METHOD FOR TRANSMITTING PUSH NOTIFICATION MESSAGE

PRIORITY

This application claims priority under 35 U.S.C. §119(a) to a Korean Patent Application filed in the Korean Intellectual Property Office on Mar. 30, 2011 and assigned Serial No. 2011-0029119, the content of which is incorporated herein by reference.

BACKGROUND OF THE INVENTION

1. Field of the Invention

The present invention relates generally to an apparatus for transmitting a push notification message, and more particularly, to an apparatus and method for transmitting a push notification message when a push notification server and a mobile terminal are disconnected from each other.

2. Description of the Related Art

A push notification server serves as a gateway between a third server for a push notification service and a mobile terminal, and relays a push notification message sent from the third server to a mobile terminal to which it is connected.

The push notification server is used by a developer of an application program installed in the mobile terminal to transmit the push notification message to the application program.

Conventional push servers, when transmitting the push notification message to the mobile terminal, do not guarantee that the push notification message will be received by the mobile terminal, because various network conditions may prevent the push notification message from being transmitted over a network.

The push server and the mobile terminal are connected to each other by a Transmission Control Protocol (TCP) connection or the like, and if the connection is lost or stopped, the mobile terminal cannot receive the push notification message sent from the push notification server.

Moreover, if a push server with which the mobile terminal re-connects is not the existing push notification server, push notification messages accumulated in the existing push notification server are not transmitted.

As such, the conventional push notification service does not provide reliable message transmission, such that the mobile terminal may fail to receive a high priority message.

Moreover, in unidirectional transmission, the third server transmits the push notification message to the mobile terminal through the push notification server regardless of whether the push server and the mobile terminal are connected with each other, resulting in a substantial waste of network resources.

SUMMARY OF THE INVENTION

Accordingly, the present invention provides a push notification apparatus and method for guaranteeing transmission of a push notification message between a push server and a mobile terminal.

According to an aspect of the present invention, there is provided an apparatus for transmitting a push notification message. The apparatus includes a connector for performing connection with a mobile terminal, a transceiver for receiving a push notification message from a push notification service providing server which provides a push notification message transmission service, and transmitting the received push notification message to the mobile terminal, a memory for storing the received push notification message, a message manager for managing the push notification message stored in the memory, and a controller for, upon receiving the push notification message from the push notification service providing server through the transceiver, transmitting the push notification message to the mobile terminal connected through the connector, and in case of disconnection from the mobile terminal, storing a push notification message received after the disconnection in the memory.

According to another aspect of the present invention, there is provided a method for transmitting a push notification message by a push notification message apparatus. The method includes performing connection with a mobile terminal, receiving a push notification message from a push notification service-providing server which provides a push notification message transmission service, and transmitting the received push notification message to the mobile terminal, and in case of disconnection from the mobile terminal, storing a push notification message received after the disconnection.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. In the following description and accompanying drawings, a detailed description of known functions or configurations incorporated herein will be omitted for the sake of clarity and conciseness.

Figure 1:
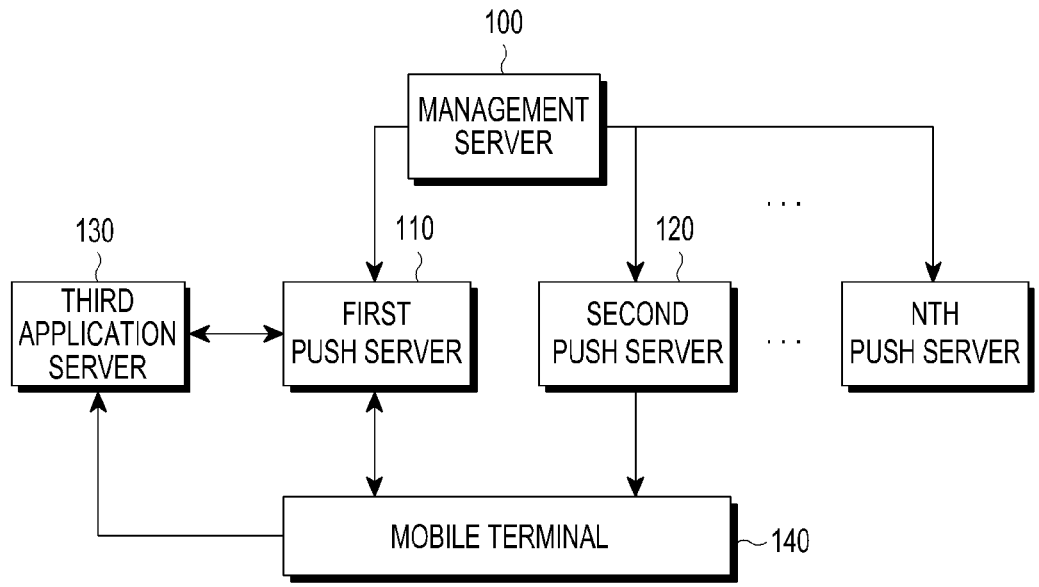
FIG. 1 illustrates a push notification system according to an embodiment of the present invention.

FIG. 1 illustrates a push notification system according to an embodiment of the present invention.

Referring to FIG. 1, the push notification system includes a management server 100, a first push server 110, a second push server 120, ..., an $n^{th}$ push server, a third application server 130, and a mobile terminal 140.

The management server 100 is connected with one or more push notification service providing servers (hereinafter push servers), and manages the connected one or more push notification servers. The management server 100 receives information about a mobile terminal connected with the push servers from the push servers, and previously stores the received information.

To provide a push notification service, the first push server 110 is TCP-connected with the mobile terminal 140, and upon receiving a push notification message together with identification information, such as a device key of the mobile terminal 140, from the third application server 130, transmits the received push notification message to the mobile terminal 140.

If the connection with the mobile terminal 140 is lost or stopped, the first push server 110 stores the push notification message received from the third application server 130 during the disconnection.

If re-connection with the mobile terminal 140 is not performed during a time duration from the disconnection, the first push server 110 sends a request for server information regarding the push server connected with the mobile terminal 140 to the management server 100.

For example, if the mobile terminal 140 is connected with the second push server 120, the first push server 110, upon receiving information regarding the second push server 120 from the management server 100, transmits the stored push notification message to the management server 100 to allow the push notification message to be transmitted to the second push server 120.

The second push server 120 is connected with the mobile terminal 140, and upon receiving the push notification message from the management server 100, transmits the received push notification message to the mobile terminal 140.

The third application server 130 receives identification information, such as a device key of the mobile terminal 140, and connection state information regarding whether the mobile terminal 140 and the first push server 110 are connected from the mobile terminal 140 to deliver the push notification message to the mobile terminal 140. Thereafter, the third application server 130 transmits the push notification message together with the received identification information to the first push server 110 by using the received connection information.

The mobile terminal 140 is connected with the first push server 110 and transmits the identification information, such as its device key, and the connection information indicating that the mobile terminal 140 is connected with the first push server 110 to the third application server 130.

Figure 2:
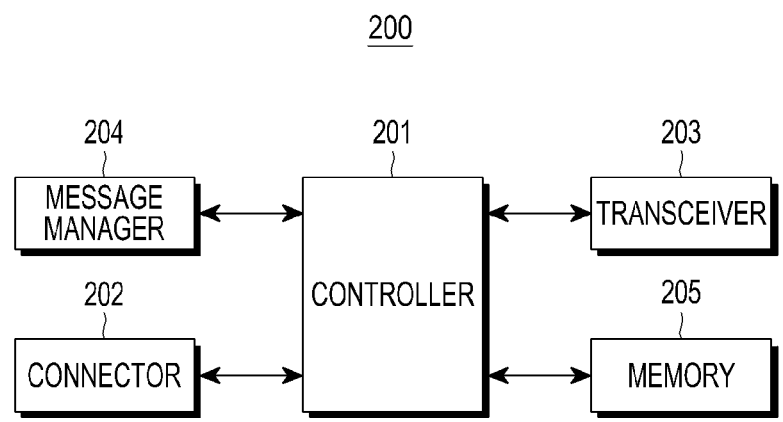
FIG. 2 illustrates a push notification server according to an embodiment of the present invention.

FIG. 2 illustrates a push notification server 200 according to an embodiment of the present invention.

Referring to FIG. 2, the push notification server 200 includes a controller 201, a connector 202, a transceiver 203, a message manager 204, and a memory 205.

The controller 201 controls overall operation of the push notification server 200. In particular, the controller 201 connects with the mobile terminal 140 and the third application server 130 through the connector 202 for a push notification service.

Upon receiving a push notification message from the third application server 130 through the transceiver 203, the controller 201 transmits the received push notification message to the mobile terminal 140 through the transceiver 203.

If transmission of the push notification message fails due to disconnection from the mobile terminal 140, the controller 201 stores the transmission-failed push notification message in the memory 205. Herein, the disconnection between the push notification server 130 and the mobile terminal 140 may occur when a user requests cancellation of the connection between the mobile terminal 140 and the push notification server 130, and when the mobile terminal 140 moves to another location and thus is connected with another push notification server.

The controller 201 checks the expiration times of previously stored push notification messages when storing the push notification message in the memory 205 and deletes a push notification message for which an expiration time has elapsed among the push notification messages stored for addresses of one or more mobile terminals, to store only recent messages to be transmitted for the respective mobile terminals.

The controller 201 determines whether the push notification server 200 and the mobile terminal 140 are to be re-connected with each other during a time duration, and processes the push notification message stored in the memory 205 through the message manager 204 based on a result of the determination.

The connector 202 connects the push notification server 200 with both the third application server 130 and the mobile terminal 140.

The transceiver 203 transmits the push notification message received from the third application server 130 to the mobile terminal 140.

The message manager 204 processes the push notification message stored in the memory 205 according to whether the mobile terminal 140 and the push notification server 200 have been re-connected with each other during the time duration.

More specifically, when the mobile terminal 140 and the push notification server 200 are re-connected, the message manager 204 transmits the push notification message stored in the memory 205 to the mobile terminal 140, determines the validity of a time at which the push notification message to be transmitted is received, and transmits or discards the push notification message according to a result of the determination. For example, if the reception time of the push notification message has elapsed, the message manager 204 may discard the push notification message without transmitting it to the mobile terminal 140.

If the push notification server 200 has not been re-connected with the mobile terminal 140 during the time duration, the message manager 204 sends a request for information regarding whether the mobile terminal 140 is connected with another push server located in another region to the management server 100.

Upon receiving push server information regarding another push notification server with which the mobile terminal 140 is connected from the management server 100, the message manager 204 delivers the push notification message stored in the memory 205 to the another push server connected with the mobile terminal 140.

Unless receiving the push server information from the management server 100, the message manager 204 sends a request for stopping transmission of the push notification message to the third application server 130, thus preventing unnecessary use of the network.

The memory 205 stores a push notification message for which transmission to a corresponding mobile terminal has failed for one or more mobile terminals. The stored push notification message may include message information such as an address of the mobile terminal 140, an address of the third application server 130, a payload, an expiration time of the push notification message, or a storage time of the push notification message.

Figure 3:
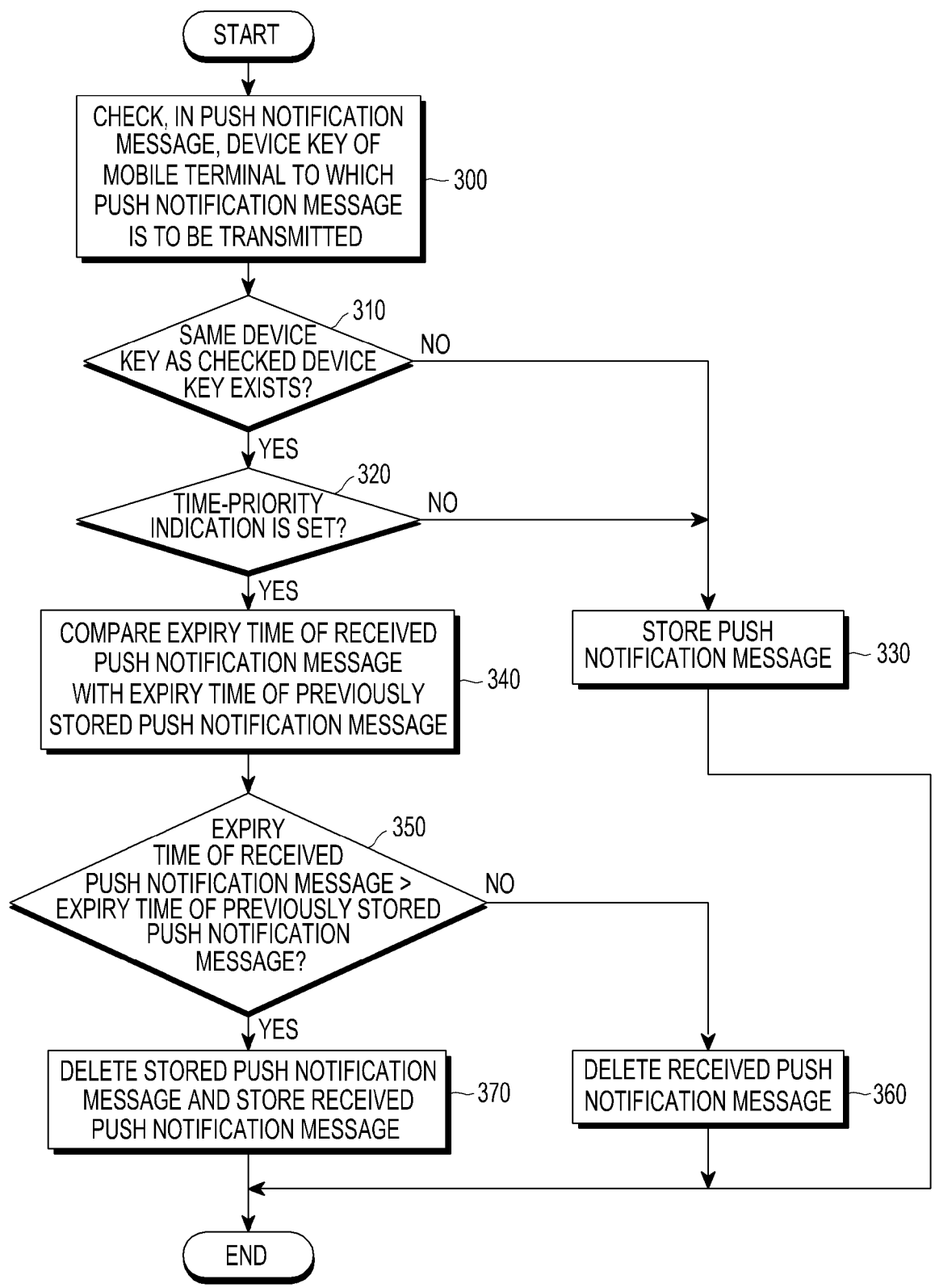
FIG. 3 illustrates a processing operation with respect to a transmission-failed push notification message if transmission of the push notification message from a push notification server to a mobile terminal fails, according to an embodiment of the present invention.

FIG. 3 illustrates a processing operation with respect to a transmission-failed push notification message when transmission of the push notification message from the push notification server 200 to the mobile terminal 140 fails, according to an embodiment of the present invention.

In FIG. 3, a description will be made of subsequent operations after disconnection between the push notification server 200 and the mobile terminal 140.

In step 300, the controller 201 checks a device key in a push notification message received from the third application server 130, wherein the device key is identification information of a mobile terminal to which the received push notification message is to be transmitted. By doing so, a push notification server may check an address of the mobile terminal.

In step 310, the controller 201 determines whether the same device key as the checked device key exists in device keys stored for a plurality of mobile terminals in the memory 205. If the same device key exists, the controller 201 proceeds to step 320, and if the same device key does not exist, the controller 201 proceeds to step 330 to store the received push notification message corresponding to the checked device key in the memory 205.

In step 320, the controller 201 determines whether time-priority indication is set in the received push notification message corresponding to the checked device key. If the time-priority indication is set, the controller 201 proceeds to step 340; unless the time-priority indication is set, the controller 201 proceeds to step 330 to accumulatively store the received push notification message in the memory 205. The time-priority indication refers to a set value for indicating a message that has to be transmitted preferentially based on time, such as a weather forecast. Once this value is set, only the most recent push notification message is maintained.

In step 340, the controller 201 compares an expiration time of the received push notification message corresponding to the checked device key with an expiration time of a push notification message previously stored for the same device key.

In step 350, the controller 201 determines whether the expiration time of the received push notification message corresponding to the checked device key is greater than the expiration time of the push notification message previously stored for the same device key. If the expiration time of the received push notification message is greater than the expiration time of the previously stored push notification message, the controller 201 proceeds to step 370; otherwise (i.e., the expiration time of the received push notification message is less than or equal to the expiration time of the previously stored push notification message, the controller 201 proceeds to step 360 to delete the received push notification message.

In step 370, the controller 201 deletes the previously stored push notification message and stores the received push notification message in the memory 205.

As such, for push notification messages in which time-priority indication is set, their arrival orders may be reversed due to network conditions. However, through the foregoing procedure, only the most recent push notification message among push notification messages transmitted to the same destination is maintained, and when the mobile terminal is re-connected, push notification messages for which expiration times have elapsed are not delivered and only the most recent push notification message may be delivered.

Figure 4:
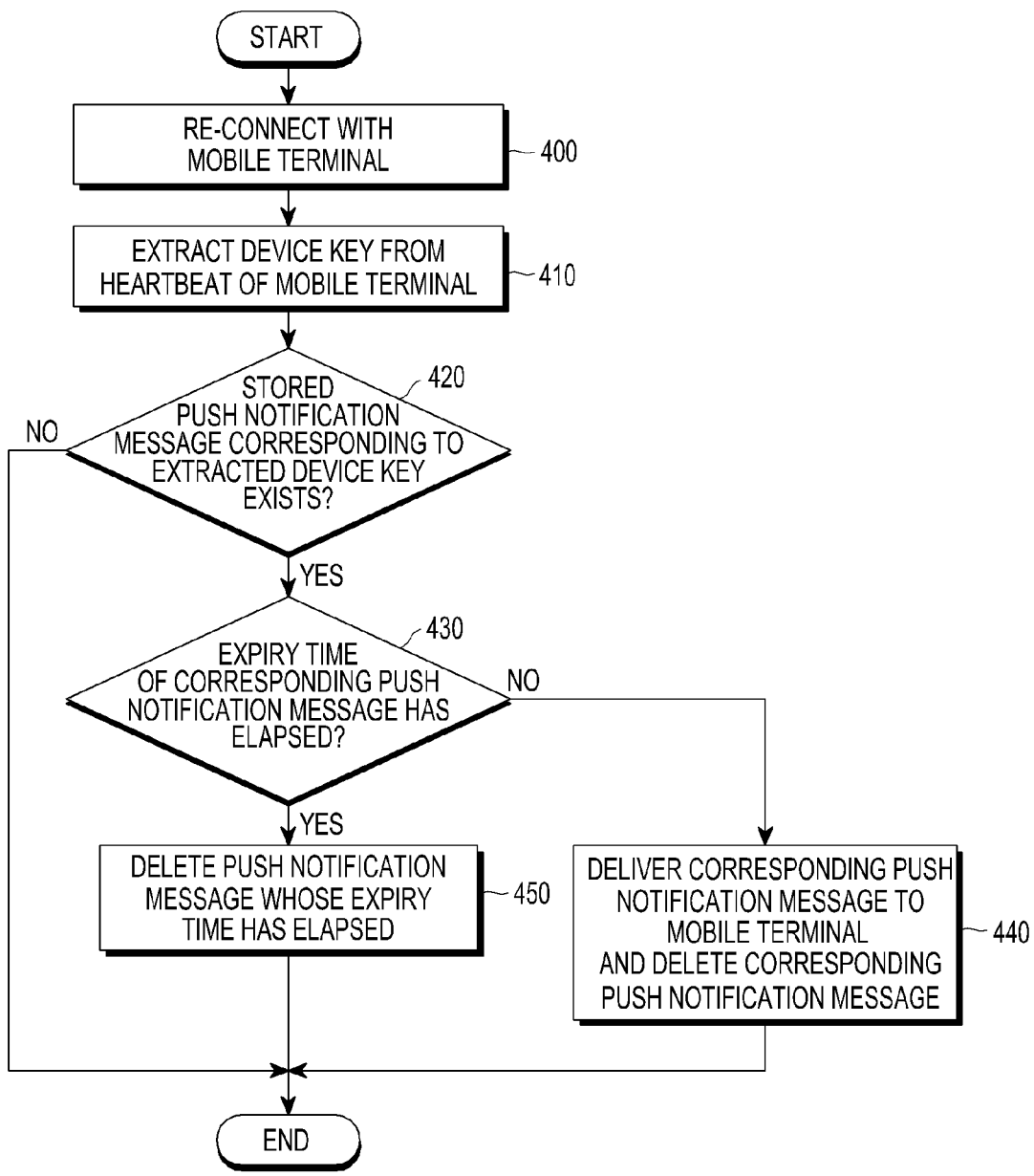
FIG. 4 illustrates a transmitting operation with respect to a stored push notification message when a push server is re-connected with a mobile terminal, according to an embodiment of the present invention.

FIG. 4 illustrates a transmitting operation with respect to a stored push notification message when the push notification server 200 is re-connected with the mobile terminal 140, according to an embodiment of the present invention.

Once the push notification server 200 is re-connected with the mobile terminal 140 in step 400, the message manager 204 in step 410 extracts a device key of the mobile terminal 140 from a heartbeat, which is periodically delivered by the mobile terminal 140 to maintain the connection.

In step 420, the message manager 204 determines whether a push notification message corresponding to the extracted device key of the mobile terminal 140 exists in the memory 205. If the corresponding push notification message exists, the message manager 204 proceeds to step 430, and if the corresponding push notification message does not exist, the message manager 204 completes the push notification message transmitting operation.

In step 430, the message manager 204 determines whether an expiration time of the push notification message corresponding to the extracted device key of the mobile terminal 140 has elapsed. If the expiration time has elapsed, the message manager 204 proceeds to step 450, and if the expiration time has not elapsed, the message manager 204 proceeds to step 440 to deliver. to the mobile terminal 140. the push notification message corresponding to the extracted device key of the mobile terminal 140 and delete the corresponding push notification message.

In step 450, the message manager 204 deletes the push notification message for which expiration time has elapsed from the memory 205.

In this manner, the message manager 204 delivers to the mobile terminal 140 a push notification message stored during disconnection with the mobile terminal 140 upon re-connection with the mobile terminal 140, such that the mobile terminal 140 can be provided with push notification messages which are not delivered during the disconnection.

Figure 5:
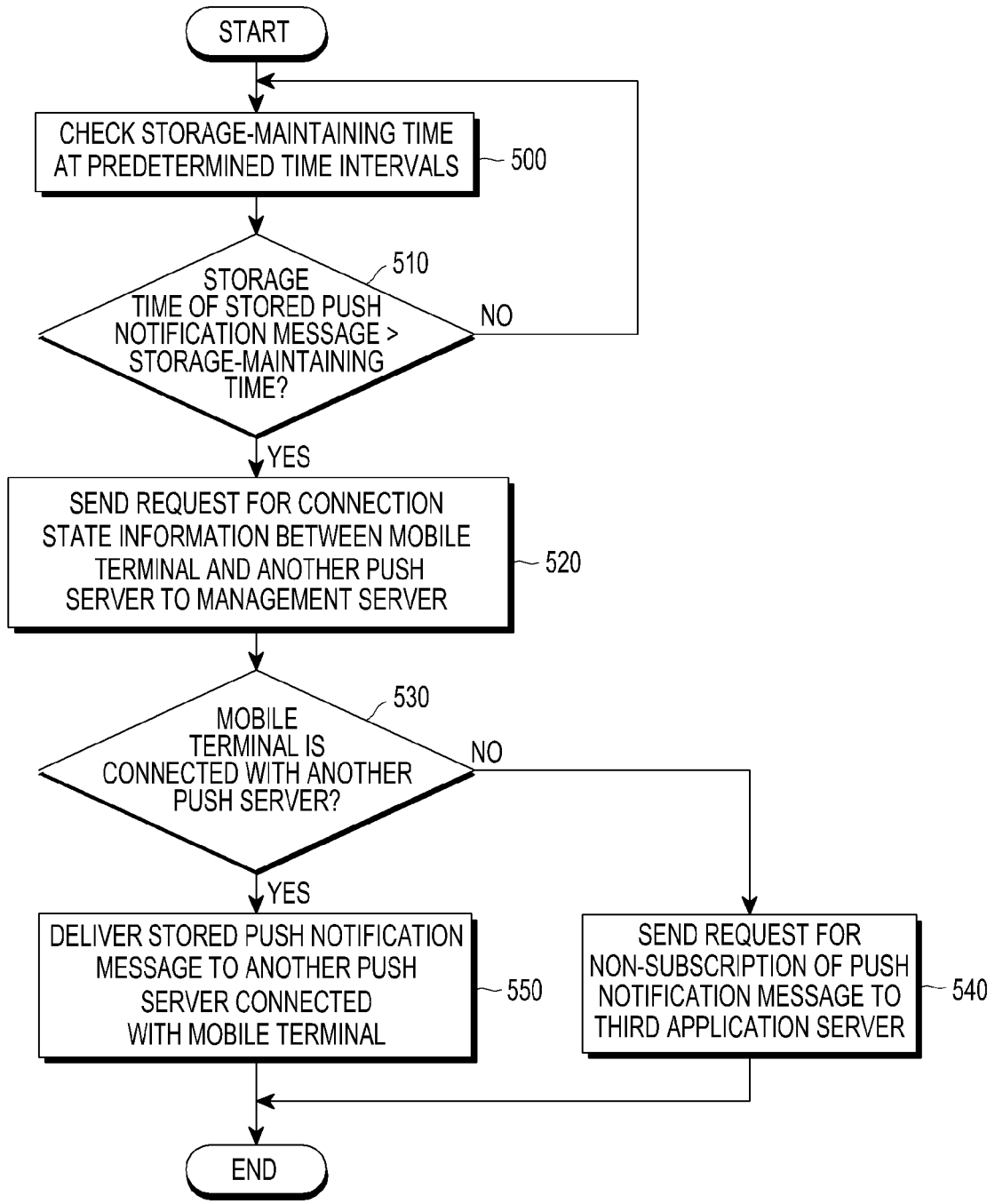
FIG. 5 illustrates a transmitting operation with respect to a push notification message when a push server and a mobile terminal are not re-connected with each other, according to an embodiment of the present invention.

FIG. 5 illustrates a transmitting operation with respect to a push notification message when the push notification server 200 and the mobile terminal 140 are not re-connected with each other during a time duration, according to an embodiment of the present invention.

In step 500, the message manager 204 checks storage-maintaining times of push notification messages stored in the memory 205 at time intervals. The storage-maintaining time refers to a time for which a corresponding push notification message is stored in the memory 205 during non-reconnection with the mobile terminal 140.

In step 510, the message manager 204 determines whether a storage time of a push notification message among the push notification messages stored in the memory 205 exceeds a storage-maintaining time. If the storage time exceeds the storage-maintaining time, the message manager 204 proceeds to step 520, and if the storage time does not exceed the storage-maintaining time, the message manager 204 proceeds to step 500 to continue checking the storage-maintaining times of the push notification messages stored in the memory 205 at time intervals.

In step 520, the message manager 204 sends a request for connection state information regarding whether the mobile terminal 140 is connected with another push server to the management server 100 which has connection state information regarding connection with the mobile terminal 140 for each push notification server.

Upon receiving the connection state information from the management server 100, the message manager 204 determines in step 530 whether the mobile terminal 140 is connected with another push server from the received connection state information. If the mobile terminal 140 is connected with another push server, the message manager 204 proceeds to step 550, and if the mobile terminal 140 is not connected with another push server, the message manager 204 proceeds to step 540 to send a request for non-subscription of a push notification message to the third application server 130.

In step 550, the message manager 204 delivers the stored push notification message to the another push server connected with the mobile terminal 140.

As is apparent from the foregoing description, the present invention guarantees transmission of a push notification message, which has not been guaranteed by a conventional push notification server, and if re-connection with a mobile terminal is not possible, a request for ending transmission of the push notification message is sent to a third server, thereby reducing unnecessary use of network resources due to meaningless delivery of the push notification message to a push server.

When the push notification server and the mobile terminal are disconnected due to network conditions, the present invention stores a push notification message received during the disconnection, and then transmits the most recent push notification message by the push server upon re-connection with the mobile terminal.

Even when the mobile terminal is re-connected with another push server other than the current push server, the connected another push server is checked through the management server to transmit the push notification message to the connected another push server.

In this manner, even when a network between the mobile terminal and the push server is disconnected or the mobile terminal is connected to another push server, a push notification message received during disconnection can be securely transmitted.

Furthermore, when the push server and the mobile terminal are connected, and the push notification message received during the disconnection is stored, an expiration time of a push notification message in which time-priority indication is set is checked and only the most recent push notification message among push notification messages transmitted to the same destination is maintained, such that unnecessary push notification messages for which expiration times have elapsed are not delivered to the mobile terminal.

Moreover, when the push server is connected with the mobile terminal, an expiration time of a push notification message is checked and only a push notification message for which the expiration time has not elapsed is delivered to the mobile terminal, thereby guaranteeing efficient push notification message transmission.

If the current mobile terminal is expected to continuously fail to receive a push notification message, a request for non-subscription of a push notification message is sent to a third server which provides a push notification service, in order to prevent an unnecessary waste of network resources, beyond a conventional unidirection push notification scheme.

While the invention has been shown and described with reference to embodiments thereof, it will be understood by those skilled in the art that various changes in form and details may be made therein without departing from the scope of the invention as defined by the appended claims and their equivalents.

What is claimed is:

1. A first push server device for transmitting a push notification message, the first push server device comprising:
    a transceiver configured to transmit and receive messages;
    a memory configured to store the messages; and
    a controller configured to:
        receive a push notification message to be transmitted to a mobile terminal from an application server through the transceiver;
        when the first push server device is connected with the mobile terminal, transmit the received push notification message to the mobile terminal through the transceiver;
        when the first push server device is disconnected from the mobile terminal, store the push notification message in the memory;
        when the first push server device is reconnected with the mobile terminal within a predetermined time duration after disconnection from the mobile terminal, transmit the stored push notification message to the mobile terminal;
        when the first push server device is not reconnected with the mobile terminal within the predetermined time duration after the disconnection from the mobile terminal, determine whether the mobile terminal is connected with a second push server device that is different than the first push server device; and
        when determining that the mobile terminal is connected with the second push server device, transmit the stored push notification message to the second push server device.

2. The first push server device of claim 1, wherein the controller checks identification information of the mobile terminal from the push notification message received after the disconnection, and stores the received push notification message according to whether a previously stored push notification message corresponding to the checked identification information exists in the memory.

3. The first push server device of claim 2, wherein if the previously stored push notification message corresponding to the checked identification information exists in the memory, the controller compares an expiration time of the received push notification message with an expiration time of the previously stored push notification message and stores the push notification message according to a result of the comparison.

4. The first push server device of claim 3, wherein the controller deletes the previously stored push notification message and stores the received push notification message in the memory if the expiration time of the received push notification message is greater than the expiration time of the previously stored push notification message, and the controller deletes the received push notification message if the expiration time of the received push notification message is less than or equal to the expiration time of the previously stored push notification message.

5. The first push server device of claim 1, wherein the controller determines whether a previously stored push notification message corresponding to identification information of the mobile terminal exists in the memory, determines whether an expiration time of the previously stored push notification message corresponding to the identification information has elapsed if the previously stored push notification message corresponding to the identification information exists in the memory, and then transmits the previously stored push notification message corresponding to the identification information of the mobile terminal according to a result of the determination regarding the expiration time.

6. The first push server device of claim 5, wherein when determining that the expiration time of the previously stored push notification message corresponding to the identification information of the mobile terminal has elapsed, the controller deletes the previously stored push notification message for which the expiration time has elapsed, and when determining that the expiration time of the previously stored push notification message corresponding to the identification information of the mobile terminal has not elapsed, the controller delivers the previously stored push notification message corresponding to the identification information to the mobile terminal through the transceiver.

7. A method for transmitting a push notification message by a first push server device, the method comprising:
- receiving, by the first push server device, a push notification message to be transmitted to a mobile terminal from an application;
- when the first push server device is connected with the mobile terminal, transmitting, by the first push server device, the received push notification message to the mobile terminal;
- storing, by the first push server device, a push notification message in a memory of the first push server device when the first push server device is disconnected from the mobile terminal;
- when the first push server device is reconnected with the mobile terminal within a predetermined time duration after disconnection from the mobile terminal, transmitting, by the first push server device, the stored push notification message to the mobile terminal;
- when the first push server device is not reconnected with the mobile terminal within the predetermined time duration after the disconnection from the mobile terminal, determining, by the first push server device, whether the mobile terminal is connected with a second push server device that is different than the first push server device; and
- when determining that the mobile terminal is connected with the second push server device, transmitting, by the first push server device, the stored push notification message to the second push server device.

8. The method of claim 7, wherein storing the push notification message comprises:
- checking identification information of the mobile terminal from the push notification message received after the disconnection; and
- storing the received push notification message according to whether a previously stored push notification message corresponding to the checked identification information exists in the memory.

9. The method of claim 8, wherein storing the received push notification message according to whether the previously stored push notification message corresponding to the checked identification information exists in the memory comprises:
- comparing, when the previously stored push notification message corresponding to the checked identification information exists in the memory, an expiration time of the received push notification message with an expiration time of the previously stored push notification message; and
- storing the push notification message according to a result of the comparison.

10. The method of claim 9, wherein storing of push notification message according to a result of the comparison comprises:
- deleting the previously stored push notification message and storing the received push notification message if the expiration time of the received push notification message is greater than the expiration time of the previously stored push notification message; and
- deleting the received push notification message if the expiration time of the received push notification message is less than or equal to the expiration time of the previously stored push notification message.

11. The method of claim 7, wherein transmitting the stored push notification message to the mobile terminal comprises:
- determining whether a previously stored push notification message corresponding to the identification information of the mobile terminal exists in the memory;
- determining whether an expiration time of the previously stored push notification message corresponding to the identification information has elapsed if the previously stored push notification message corresponding to the identification information exists in the memory; and
- transmitting the previously stored push notification message corresponding to the identification information of the mobile terminal according to a result of the determination regarding the expiration time.

12. The method of claim 11, wherein transmitting the previously stored push notification message corresponding to the identification information of the mobile terminal according to a result of the determination regarding the expiration time comprises:
- deleting, when determining that the expiration time of the previously stored push notification message corresponding to the identification information of the mobile terminal has elapsed, the previously stored push notification message for which the expiration time has elapsed; and
- delivering, when determining that the expiration time of the previously stored push notification message corresponding to the identification information of the mobile terminal has not elapsed, the previously stored push notification message corresponding to the identification information to the mobile terminal.

13. The first push server device of claim 1, wherein the controller is further configured to:
- send a request for server information regarding the second push server device connected with the mobile terminal to a management server; and
- when receiving the server information regarding the second push server device connected with the mobile terminal, determine that the mobile terminal is connected with the second push server device.

14. The first push server device of claim 1, wherein the controller is further configured to:
- when determining that the mobile terminal is not connected with the second push server device, send, to the application server, a request for stopping transmission of another push notification message to be transmitted to the mobile terminal.

15. The method of claim 7, wherein determining whether the mobile terminal is connected with the second push server device comprises:
- sending, by the first push server device, a request for server information regarding the second push server device connected with the mobile terminal to a management server; and
- when receiving the server information regarding the second push server device connected with the mobile terminal, determining, by the first push server device, that the mobile terminal is connected with the second push server device.

16. The method of claim 7, further comprising:
- when determining that the mobile terminal is not connected with the second push server device, sending, to the application server by the first push server device, a request for stopping transmission of another push notification message to be transmitted to the mobile terminal.

* * * * *